US009675171B2

(12) United States Patent
Kahler et al.

(10) Patent No.: US 9,675,171 B2
(45) Date of Patent: Jun. 13, 2017

(54) OUTDOOR APPLIANCE WITH RETRACTABLE PLATFORM

(71) Applicant: Lamplight Farms Incorporated, Menomonee Falls, WI (US)

(72) Inventors: Andrew Wolf Kahler, Fortson, GA (US); Justen Deering England, Madison, WI (US)

(73) Assignee: Lamplight Farms Incorporated, Menomonee Falls, WI (US)

( * ) Notice: Subject to any disclaimer, the term of this patent is extended or adjusted under 35 U.S.C. 154(b) by 0 days.

(21) Appl. No.: 14/433,839

(22) PCT Filed: Sep. 27, 2013

(86) PCT No.: PCT/US2013/062341
§ 371 (c)(1),
(2) Date: Apr. 6, 2015

(87) PCT Pub. No.: WO2014/055366
PCT Pub. Date: Apr. 10, 2014

(65) Prior Publication Data
US 2015/0250305 A1      Sep. 10, 2015

Related U.S. Application Data

(60) Provisional application No. 61/710,317, filed on Oct. 5, 2012.

(51) Int. Cl.
*A47B 37/00*     (2006.01)
*A47B 37/04*     (2006.01)
(Continued)

(52) U.S. Cl.
CPC ............ *A47B 37/04* (2013.01); *A47B 13/088* (2013.01); *F23D 14/28* (2013.01); *F24C 3/00* (2013.01);
(Continued)

(58) Field of Classification Search
CPC ....... A47B 37/00; A47B 37/04; A47B 13/088; A47B 9/00; A47B 11/00; A47B 1/02;
(Continued)

(56) References Cited

U.S. PATENT DOCUMENTS 3,813,207 A * 5/1974 Ramey .................... F24C 3/122
126/41 R
4,349,713 A * 9/1982 Marsen .................. H05B 6/766
126/19 M
(Continued)

FOREIGN PATENT DOCUMENTS

DE          3621100 A1 *  1/1987  .......... A47J 37/0781
DE       19903959 A1 *  8/2000  .......... A47B 13/088
(Continued)

*Primary Examiner* — Daniel J Troy
*Assistant Examiner* — Andres F Gallego
(74) *Attorney, Agent, or Firm* — David G. Woodral; Gable Gotwals

(57) ABSTRACT

A base has an open top, an aperture coaxial with the open top of the base, and an actuator. The device includes a cover for the aperture that is moveable between a first closed position and a second open position in response to a first displacement of the actuator, and a platform moveable from a first lower position within the base to a second raised position proximate the tabletop in response to a second displacement of the actuator.

14 Claims, 13 Drawing Sheets

(51) Int. Cl.
*F24C 3/00* (2006.01)
*A47B 13/08* (2006.01)
*F23D 14/28* (2006.01)
*F24C 15/08* (2006.01)
*A47J 37/07* (2006.01)

(52) U.S. Cl.
CPC ............ *F24C 15/08* (2013.01); *A47J 37/0731* (2013.01); *A47J 37/0781* (2013.01)

(58) Field of Classification Search
CPC ..... A47B 1/03; A47J 37/0781; A47J 37/0731; A47J 37/0713; A47J 37/0727; A47J 37/074; A47J 2037/0777; A47J 33/00; A47J 36/26
See application file for complete search history.

(56) References Cited

U.S. PATENT DOCUMENTS

| | | | | |
|---|---|---|---|---|
| D286,002 S | * | 10/1986 | Brix | D7/332 |
| 5,156,095 A | * | 10/1992 | Hansbaek | A47B 13/088 108/66 |
| 5,168,796 A | * | 12/1992 | Porton | A47J 37/0781 108/50.13 |
| 5,329,863 A | * | 7/1994 | Rasmussen | A47B 1/03 108/67 |
| 6,742,461 B1 | * | 6/2004 | Sen | A47B 1/02 108/86 |
| 6,769,906 B1 | * | 8/2004 | Grove | F23D 14/28 126/519 |
| 8,997,659 B2 | * | 4/2015 | Leduc | A47B 9/00 108/68 |
| 2006/0054160 A1 | * | 3/2006 | Borowske | F24C 3/14 126/512 |
| 2016/0166109 A1 | * | 6/2016 | Banal | A47J 37/0781 108/50.13 |

FOREIGN PATENT DOCUMENTS

| | | | | |
|---|---|---|---|---|
| DE | 10001475 A1 | * | 7/2001 | ............... A47B 1/03 |
| KR | DE 9402481 U1 | * | 7/1994 | ............. A47B 31/02 |

* cited by examiner

OUTDOOR APPLIANCE WITH RETRACTABLE PLATFORM

CROSS REFERENCE TO RELATED APPLICATIONS

This application claims the priority of U.S. Provisional Patent Application No. 61/710,317 entitled "OUTDOOR APPLIANCE WITH RETRACTABLE PLATFORM," filed Oct. 5, 2012, the contents of which are hereby incorporated by reference.

FIELD OF THE INVENTION

This disclosure is related to fire pits in general and, more particularly, to gas a powered fire pit with a retractable burner.

BACKGROUND OF THE INVENTION

Appliances are available that produce no flames, yet provide adequate heat and light for outdoor activities. However, for aesthetic and other reasons, consumers often prefer to have an arrangement where visible combustion may be observed. Bonfires, campfires, open fire pits, chimineas, and fireplaces are but a few examples of heating and/or lighting implements having open, or at least visible, flames. However, the setup time and maintenance of these devices is inconvenient. Ignition of fires can be frustrating and time consuming. Another inconvenience is finding and maintaining an adequate fuel supply. Wood piles draw pests and unless the wood is kept covered and dry it can be prone to rot. Dealing with ashes from wood fires is yet another hassle. Furthermore, fire appliances may be decorative or attractively constructed, but they may not be considered useful when there is no fire providing heat or light.

What is needed is a system and device for addressing the above, and related concerns.

SUMMARY OF THE INVENTION

The invention of the present disclosure, in one aspect thereof, comprises a base having an open top, an aperture coaxial with the open top of the base, and an actuator. The device includes a cover for the aperture that is moveable between a first closed position and a second open position in response to a first displacement of the actuator, and a platform moveable from a first lower position within the base to a second raised position proximate the tabletop in response to a second displacement of the actuator. In some embodiments, separate actuators may be used to effect movement of the cover and the platform, respectively.

In some embodiments, the cover for the aperture further comprises a multi-leaved iris having a first closed position where the leaves are closed over the open top of the base and a second closed position where the leaves are displaced away from the open top of the base.

The actuator may be attached to an upper guide member that receives a follower from each of the plurality of iris leaves and displaces the followers within a plurality of tracks to move the aperture between the open and closed positions. In another embodiment, the actuator is attached to a lower guide member that receives at least one follower from the platform and displaces the at least one follower within at least one track to move the platform between the lower and upper positions.

In further embodiments, the actuator comprises a rim proximate and below an outer edge of a table top surrounding the aperture, an attached upper guide member that receives a plurality of followers attached to the plurality of iris leaves, and an attached lower guide member that receives at least one follower attached to the platform. The upper guide member moves the iris leaves by displacement of the received iris leaf followers in response to the first displacement of the actuator. The lower guide member moves the platform by displacement of the at least one platform follower in response to the second displacement of the actuator.

The upper guide member may have at least one track receiving an iris follower, the track defining a first, translating section adjacent to a second, non-translating section, the translating section providing for displacement of the received iris follower and the non-translating section allowing rotation of the upper guide member without displacement of the received iris follower. The lower guide member may have at least one track receiving the at least one follower attached to the platform, the track defining a first inclined, sloped, or angled section adjacent to a second, level section, the inclined section providing for elevation and lowering of the received follower and the level section allowing rotation of the lower guide member with no elevation change to the received follower. The upper guide member may be affixed to the lower guide member such that the translating section of the upper guide member is positioned atop the level section of the lower guide member and the non-translating section of the upper guide member is positioned atop the included section of the lower guide member.

Some embodiments provide a platform guide member that receives the at least one follower from the platform and substantially restricts rotation of the platform. The platform may comprise a gas burner. A drawer may be contained within the base for retaining an operational fuel container for the gas burner. The device may include a heat shield in the base that shields the fuel container from the gas burner.

The invention of the present disclosure, in another aspect thereof, comprises a device with a base having an open top, a tabletop positioned proximate the open top of the base and having an aperture coaxial with the open top of the base, a cover for the aperture moveable between a first closed position and a second open position in response to a displacement of a first follower, and a platform moveable from a first lower position within the base to a second raised position proximate the tabletop in response to a displacement of a second follower. In some embodiments the cover comprises a multi-bladed iris with the first follower attached to at least one of the blades. The platform may further comprise a gas burner.

The disclosed device may also comprise an upper guide member defining at least one track that receives the first follower and displaces it to effect opening of the aperture in response to rotation of the first guide member relative to the base. The at least one track of the upper guide member may have a first section that displaces the follower from an inner position, corresponding to the closed position of the cover, to an outer position, corresponding to the open position of the cover, and the guide member may have a second section that allows the guide member to rotate but retains the follower in the outer position.

The disclosed device may comprise a lower guide member defining at least one track that receives the second follower and elevates it to effect raising of the platform from the first lower position to the second raised position. The at least one track of the lower guide member may have a level portion that allows rotation of the lower guide member without elevation of the platform, and may have a second inclined portion that elevates the platform in response to rotation of the lower guide member.

The invention of the present disclosure, in another aspect thereof, comprises a fire pit with a pedestal base having an open top and a laterally opening sliding drawer for receiving a compressed gas cylinder. The device has a table top proximate the open top of the pedestal base and having an aperture coaxial with the open top of the pedestal base and a rotatable actuator proximate the table top. A multi-bladed iris diaphragm is displaceable between a first closed position closing the aperture and a second open position opening the aperture. A fire platform is above a location corresponding to the compressed gas cylinder and is displaceable from a first lower position within the pedestal base to a second upper position proximate the table top. The actuator provides a first set of tracks that correspond to a first set of track followers attached to the blades of the multi-bladed iris diaphragm such that the tracks displace the iris blades outward from the aperture in response to rotation of the actuator in a first direction a first, predetermined rotational distance. The actuator also provides a second set of tracks that correspond to a second set of track followers attached to the fire platform such that the fire platform is elevated from the first lower position to the second upper position in response to rotation of the actuator in the first direction a second, predetermined rotational distance.

Some embodiments further include a thermocouple affixed to the diaphragm providing a signal to a magnetic valve on a gas supply line and are configured to interrupt the flow of gas in response to the application of heat. Some embodiments may also include a thermocouple proximate the fire platform providing a signal to a magnetic valve on a gas supply line and configured to interrupt the flow of gas in response to loss of heat from the fire platform.

DETAILED DESCRIPTION OF THE PREFERRED EMBODIMENTS

Figure 1A:
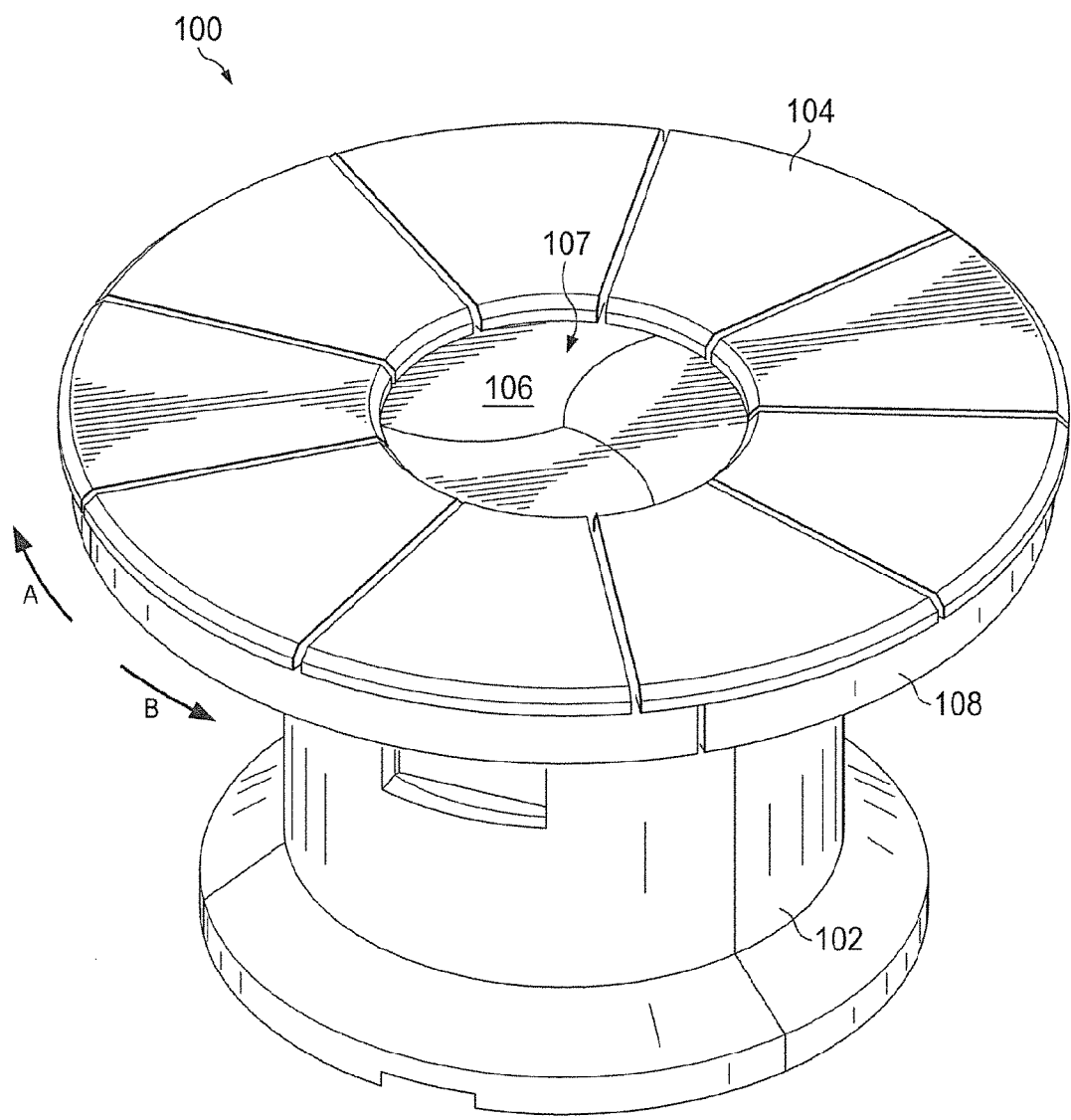
FIG. 1A is a perspective view of one embodiment of an appliance with a retractable platform shown in a retracted position.

Referring now to FIG. 1A, a perspective view of an outdoor appliance with a retractable platform in a retracted position is shown. The appliance 100 comprises a multipart pedestal or base 102 supporting a top 104 on an open top 105 (FIG. 3) of the base 102. The top 104 may serve as a tabletop for dining and other activities. The top 104 may be circular, as shown, or may have other shapes. In the present embodiment the top 104 has a cover 106 proximate a center thereof that covers closes an aperture 107 in the top 104. In the present embodiment the cover 106 operates in an iris-like fashion to selectively open and close in response to movement of an actuator 108.

The particular operation of the cover 106 and other components of the appliance 100 will be described in greater detail below. However, it can be seen from the present viewpoint that the actuator 108 comprises a ledge or rim along an outer portion or periphery of the top 104. The actuator 108 may be grasped and moved in a clockwise manner as shown by the arrow A to open the cover 106. The actuator 108 may be moved in a counterclockwise manner as shown by the arrow B to close the cover 106. In the present embodiment, the actuator 108 is allowed to rotate independently from the pedestal 102 and the top 104 such that the appliance 100 itself does not move or turn when the actuator 108 is utilized to open or close the cover 106.

Figure 1B:
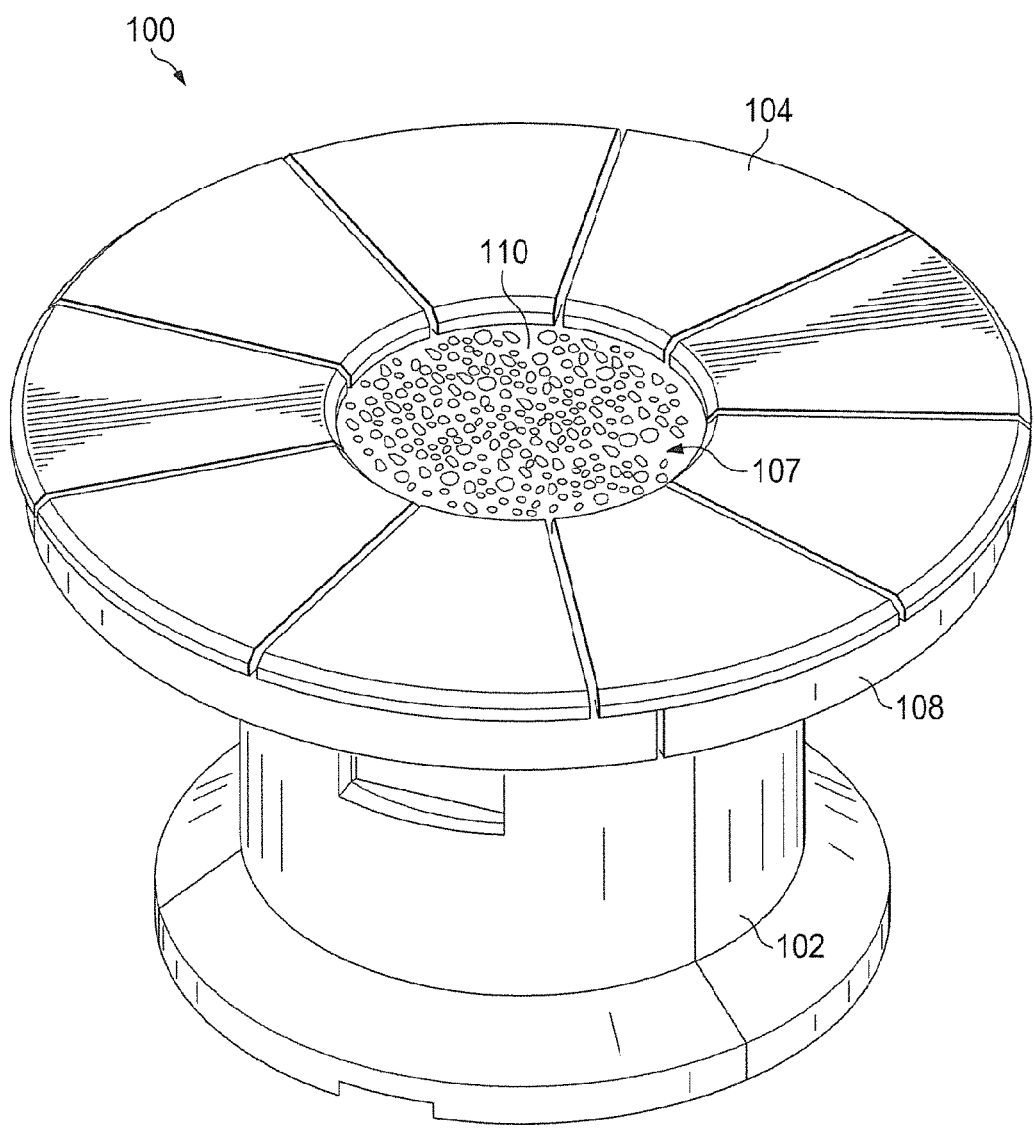
FIG. 1B is a perspective view of a the appliance of FIG. 1A with the platform in an elevated position.

Referring now to FIG. 1B, a perspective view of the appliance 100 with the retractable platform 110 in an elevated position is shown. In the view of FIG. 1B, the actuator 108 has been utilized to retract or open the cover 106 exposing the fire bowl 110. In the present embodiment, the platform 110 comprises a fire bowl containing rocks, pebbles, glass, water, or other media through which gas or flames escape when the fire pit 100 is operational.

Figure 2:
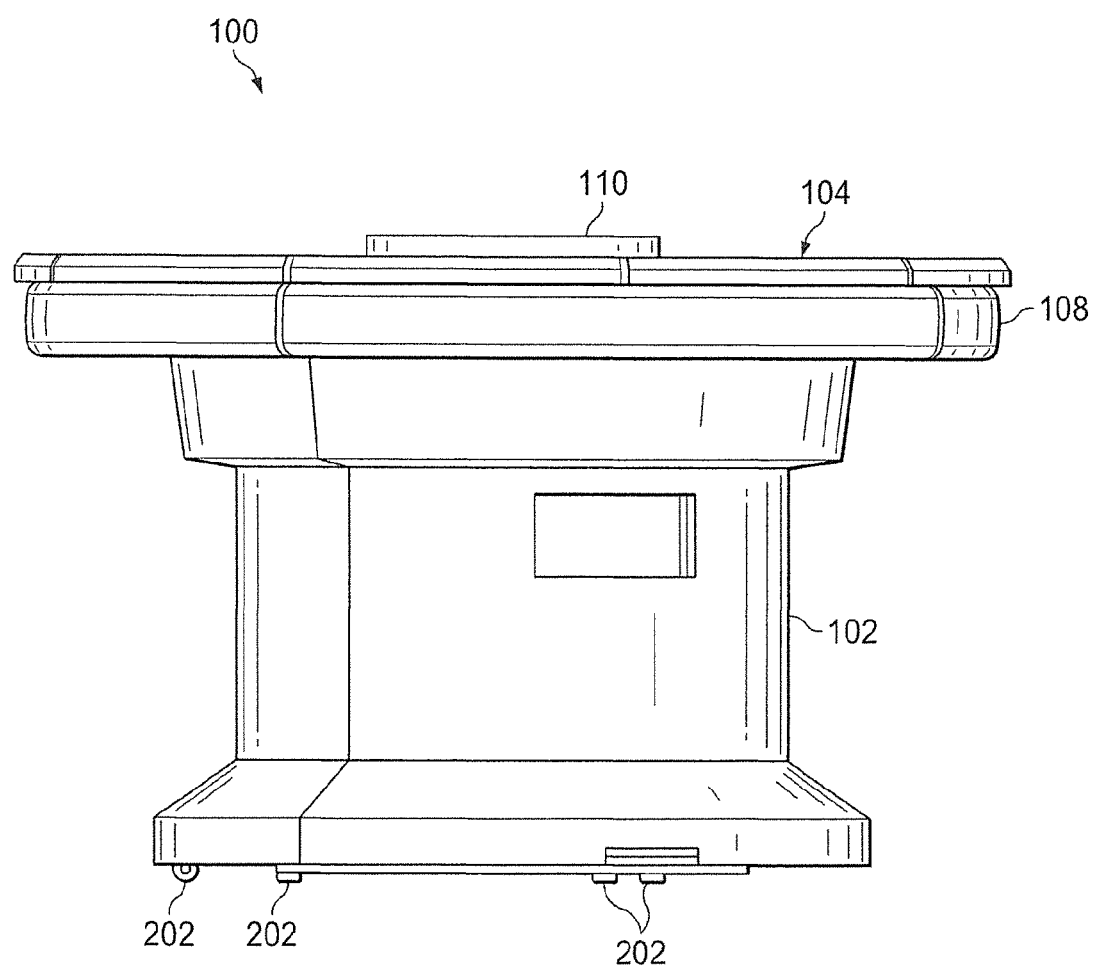
FIG. 2 is a side view of the appliance of FIG. 1.

Referring now to FIG. 2, a side view of the appliance 100 is shown. In some embodiments, the platform 110 sits at or slightly above the level of the top 104 when fully elevated. The top 104 sits over the separate actuator rim 108. These all sit atop the multipart pedestal 102. In various embodiments, the pedestal 102 may provide one or more feet 202. Further, the various embodiments described herein are shown with a platform 110 comprising a fire bowl elevating from, or contained within, the pedestal 102. However, it is understood that other desired implements may be substituted or added. For example, a cooler or other storage device may be contained within the pedestal 102 and accessed as described herein.

Figure 3:
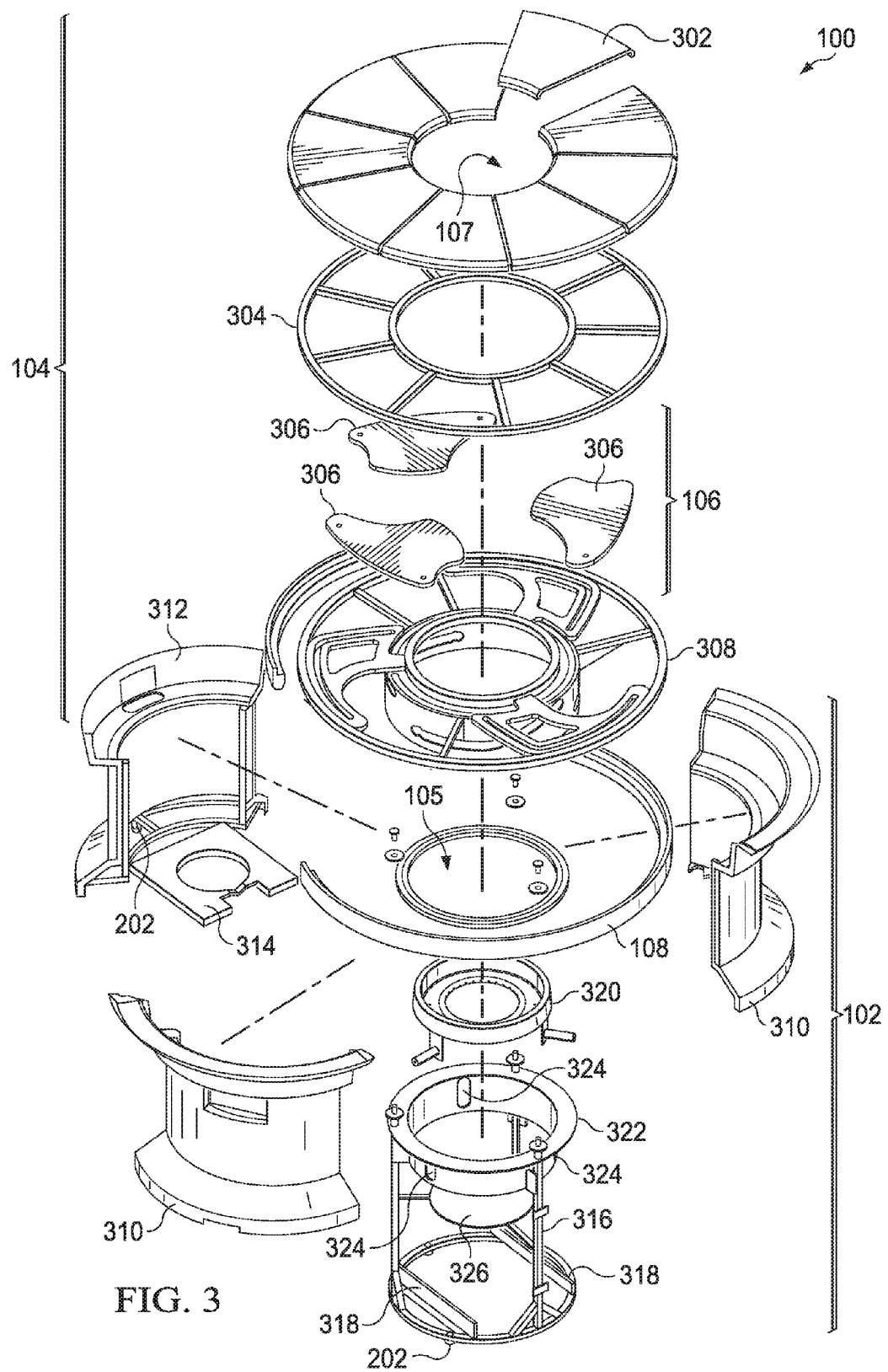
FIG. 3 is an exploded perspective view of the appliance of FIG. 1.

Referring now to FIG. 3, an exploded perspective view of the appliance 100 is shown. In the present embodiment, the top 104 includes a frame 304 to which a number of covers 302 are attached. The covers 302 form the upper surface of the top 104 which may be utilized for dining or other purposes. In the present embodiment, the cover 106 comprises a plurality of iris leaves 306. Three leaves 306 are shown here but more or fewer leaves are also contemplated. It is also understood that the present disclosure is not limited to the particular illustrated shape of the iris leaves 306. However, in some embodiments the leaves 306 are shaped such that the plurality of leaves cooperate to substantially cover or close the entire aperture 107. The leaves 306 selectively open or close to reveal the platform 110. In some embodiments, the platform 110 comprises a fire bowl, and although the leaves 306 may not come into contact with flame, nor be placed over the fire bowl 110 when it is active, they may be constructed from a metal or heat resistant material in the event that a user closes the fire pit 100 when the fire bowl 110 is still hot.

From the exploded view of FIG. 3 it can be seen that, in the present embodiment, the pedestal or base 102 defines an opening under the top 104. The top 104 covers the open-topped pedestal 102 with the aperture 107 approximately centered over the pedestal 102. The aperture 107 is opened and closed (via the iris leaves 306) to selectively expose the platform 110. As explained more thoroughly below, the mechanism for opening and closing the cover 106 may be a track and follower arrangement. A guide member 308 may define the tracks that move the iris leaves 306. As explained below, the guide member 308 also provides functionality for elevating and lowering the platform 110.

The pedestal 102 comprises a number of additional components, including one or more pedestal sections 310. In the present embodiment the pedestal sections 310 serve as decorative covers to the multipart pedestal 102. The sections 310 may comprise a metal or polymer of any shape and size and may be provided with a decorative surface. It is contemplated that the appliance 100 is at least somewhat portable in that it may be moved between locations when fully assembled. In the present embodiment, there are two pedestal sections 310 that cooperate with a third pedestal section operating as a drawer 312. The drawer 312 may provide a shelf 314 for securely retaining a gas cylinder (not shown) providing gas when the platform 110 comprises a fire bowl. In some embodiments, standard 20 pound propane cylinders may be utilized.

In the present embodiment, the pedestal sections 310 and the shelf 314 may be attached to a pedestal frame 316. The pedestal frame 316 also provides a plurality of slides 318 for receiving the shelf 314 and/or drawer 312. The frame 316 may be provided with one or more feet 202 for stabilization. In some embodiments the drawer 312 and/or pedestal sections 310 may also be provided with feet 202.

As was shown in FIG. 1, platform 110 may comprise a fire bowl filled with fire resistant media such as gravel, stones, glass, or water. From FIG. 3 it can be seen that the fire bowl 110 further comprises an elevating and lowering platform in the form of a burner 320. In some embodiments the media is placed within the burner 320 which provides the gas supply for combustion. In addition to providing for opening and closing of the cover 106, the guide member 308 may also provide for timed elevation and lowering of the burner 320. As the burner 320 has no need to rotate, a number of tracks 324 may be defined in a burner guide 322 that guides the burner 320 to allow elevation changes without rotation. In some embodiments a heat shield 326 is provided and attached to the frame 316 to isolate the gas cylinder (not shown) from any excess heat coming from the burner 320.

Figure 4:
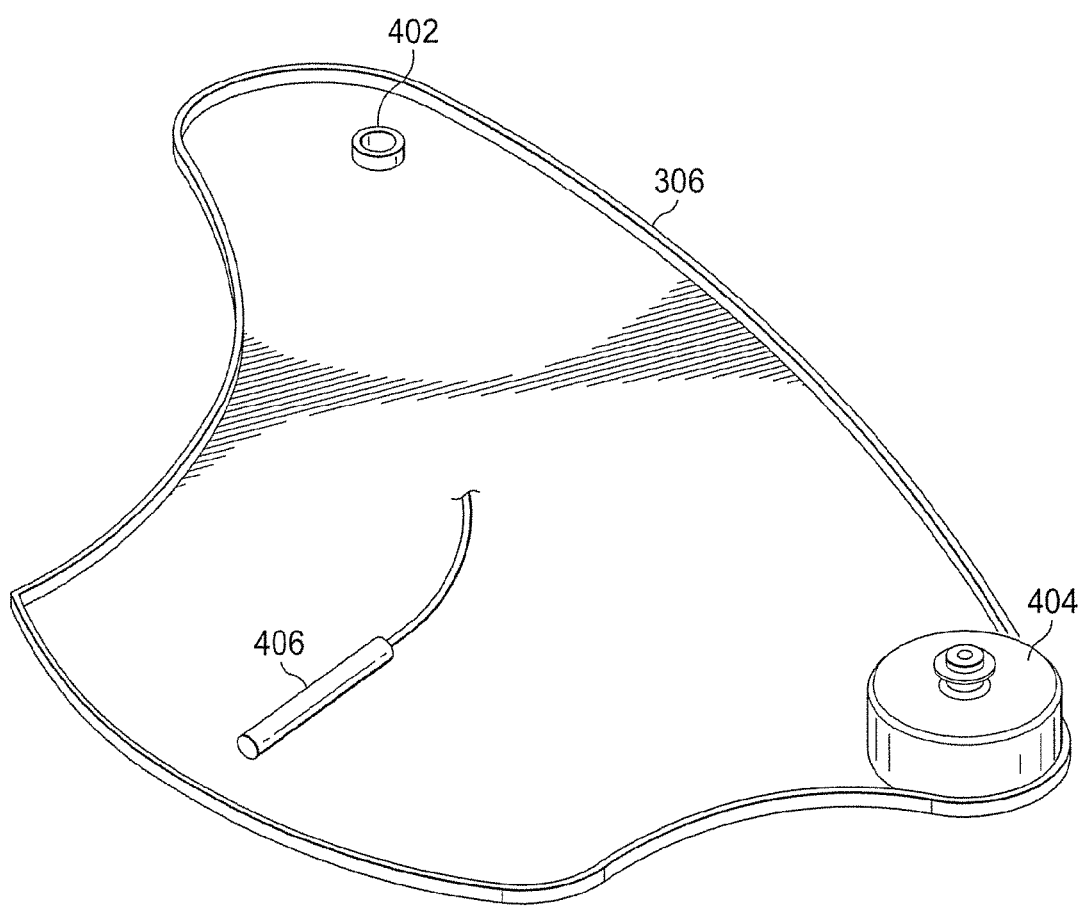
FIG. 4 is a perspective view of the underside of an iris member with attached track followers.

FIGS. 4-7 provide additional detail on various components that are shown in FIG. 3. A more thorough understanding of the components discussed below will be helpful in understanding the operation of the appliance 100. FIG. 4 illustrates a perspective view of an underside of an iris member 306. Each of the iris members 306 has a pivot attachment point 402 and an attached follower 404. One or more of the iris members 306 may be provided with an attached thermocouple 406. The thermocouple 406 provides a voltage based upon exposure to heat. As explained more fully below, the thermocouple 406 may be utilized as a safety device for preventing over heating or burning of the iris members 306 and/or other components of the device 100.

Figure 5:
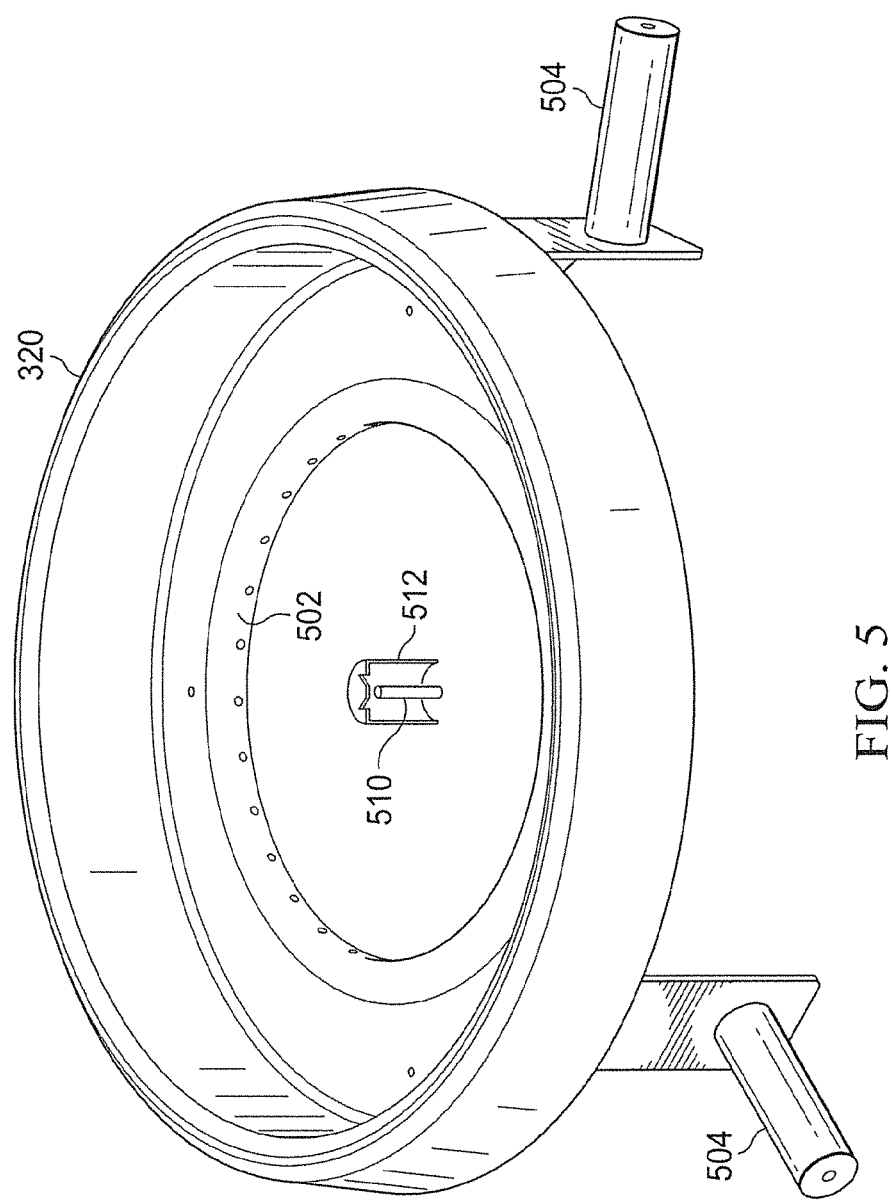
FIG. 5 is a view of a fire bowl with attached track followers.

FIG. 5 is a perspective view of the burner 320 showing a gas supply ring 502 that provides fuel to the burner 320. As will be explained more fully below, a thermocouple 510 may be provided within or attached to the burner 320. A protective cover 512 (shown in cutaway) may be provided for preventing any of the fire resistant media from contaminating or damaging the thermocouple 510. A plurality of followers 504 may also be attached to the burner 320.

Figure 6:
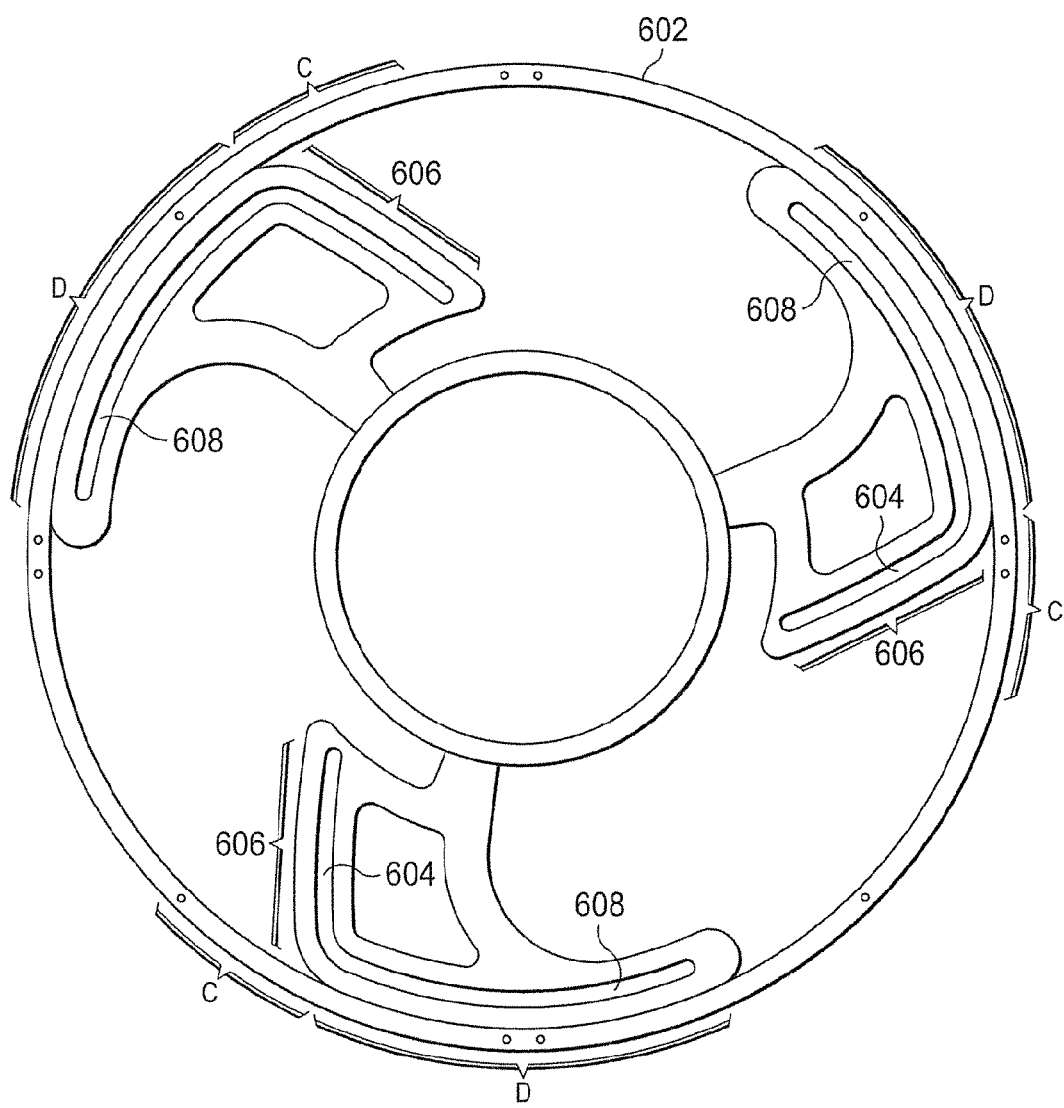
FIG. 6 is a top down view of another guide member that provides iris opening tracks for a fire bowl cover.
Figure 7:
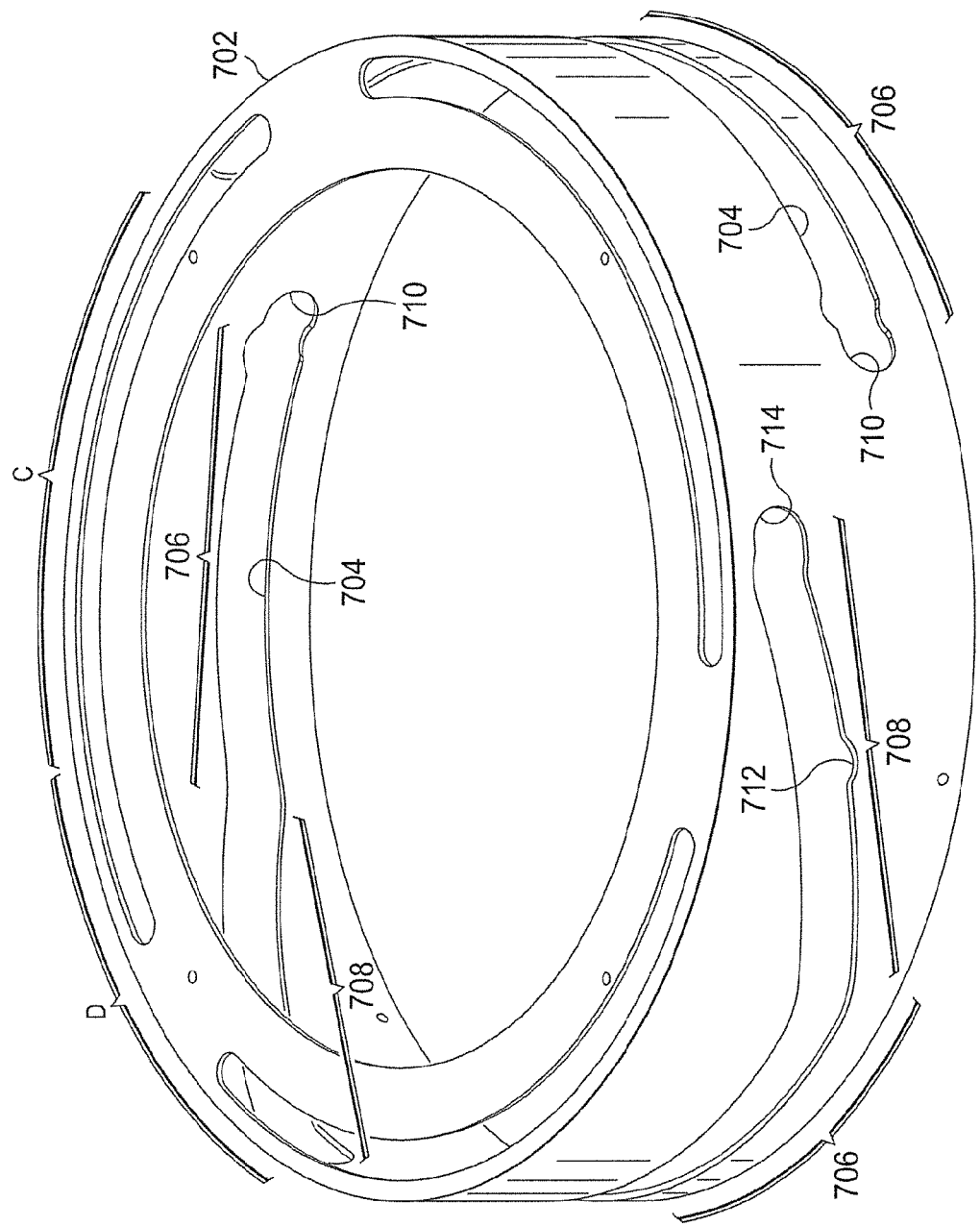
FIG. 7 is a perspective view of a guide member that provides elevation tracks for a fire bowl.

The guide member 308 of the present embodiment includes two major subcomponents: an upper guide member 602, shown in FIG. 6; and a lower guide member 702, shown in FIG. 7. In the present embodiment these two components are affixed together but they are shown separated here for clarity and purposes of illustration.

FIG. 6 is a top down view of the upper guide member 602. The upper guide member 602 is primarily responsible for the opening and closing of the cover 106 via movement of the iris leaves 306. A plurality of tracks 604 are provided by the upper guide member 602. In the present embodiment each of the tracks 604 comprises two separate sections. A translating section 606 is provided, along with a non-translating section 608. The followers 404 of the iris leaves 306 each fit within one of the tracks 604. When the guide member 308 is rotated, the upper guide member 602 displaces the end of the iris leaves 306, to which the follower 404 is attached. With the pivot point 402 rigidly affixed to a non-rotating portion of the appliance 100 (e.g., such as the frame 316) the iris leaves 306 will function to open and close in an iris-like fashion in response to rotation of the upper guide member 602.

It will be appreciated that, due to the configuration of the tracks 604, the iris leaves 306 will only translate (e.g., open or close) when the followers 404 are within the translating section 606 of the tracks 604 of the upper guide member 602. This radial section is illustrated for each of the tracks 604 by the segment marker C. Additional rotation of the upper guide member 602 relative to the associated followers 404 of the iris leaves 306 is allowed by movement of the followers 404 through the non-translating section 608 of the tracks 604. This radial rotational segment is marked D in FIG. 6.

FIG. 7 shows a perspective view of a lower guide member 702. In the present embodiment, the lower guide member 702 may be affixed to the upper guide member 602 such that the marked segments C and D align. In such case, the lower guide member 702 will rotate along with the upper guide member 602 as the unitary guide member 308. The lower guide member 702 is primarily responsible for elevation and/or lowering of the burner 320. In the present embodiment, a plurality of tracks 704 are provided that interact with the plurality of guides 504 of the burner 320. The tracks 704 each provide a level portion 706 along the segment C of the lower guide member 702.

Segment C of FIG. 7 corresponds with segment C of FIG. 6. Rotating with the guides 504 in segment C does not provide any elevation change to the burner 320. This allows the iris leaves 306 to be translated away from the burner 320 by the upper guide member 602. In the tracks 704 adjacent to the level portions 706 is an inclined, sloped, or angled portion 708. The portion 708 departs in its direction from the plane or the top or bottom of the guide member 702 (e.g., it moves toward or away from such planes). When lower guide member 702 is rotated in a clockwise direction, the guides will be elevated by the portion 708. The burner 320 is isolated from the possibility of rotating (rather than, or in addition to, elevating) owing to the fact that the followers 504 also fit within the slots 324 of the burner guide 322.

Because there will be at least some amount of load bearing placed on the lower guide member 702 by the guides 504, stops may be machined into the tracks 704. For example, a lower stop 710 may be provided as a bump in the track 704 such that the fire pit 100 may be secured against inadvertent opening or rotation. One or more intermediate stops 712 may be machined in the tracks 704 such that a user does not have to completely elevate the burner 320 with one movement, or retain the actuator 108 against reversal while changing hands. Finally, an upper stop 714 may be provided as a machined valley near the upper most portion of the inclined portion 708 such that the burner 320 may be brought to rest at or near the fully elevated position.

It will be appreciated that, in operation, the actuator 108 controls the movement of the entire guide member 308, which comprises the upper guide member 602 in combination with the lower guide member 702. In response to a first predetermined amount of clockwise rotation of the actuator 108, the cover 106 will be completely opened. In response to a further rotation of the actuator 108 in the clockwise direction, the platform 110 will be elevated into place at or near the top 104 of the appliance 100.

Various ignition and extinguishing mechanisms may be employed as are known in the art. Following extinguishing the burner 320, the actuator 108 may be rotated in a counterclockwise direction whereupon the platform 110 will be retracted into the pedestal 102. Upon further counterclockwise rotation, the cover 106 will return to its closed position and an iris-like fashion. In the present embodiment, a single actuator 108 controls the opening of the cover 106 and the elevation of the platform 110. However, in other embodiments separate actuators could be utilized. Where separate actuators are utilized, the upper guide member 602 may be separated from the lower guide member 702. In such case, a user may wish to be mindful that the cover 106 is open prior to elevating the platform 110 into position. It should also be understood that opening and closing of the cover 106 and/or elevating and lowering of the platform 110 could be accomplished by other means, including those that are mechanical or hydraulic in nature. These may be interrelated as in the case of the joined upper guide member 602 and lower guide member 702, or may be separately operable.

Figure 8:
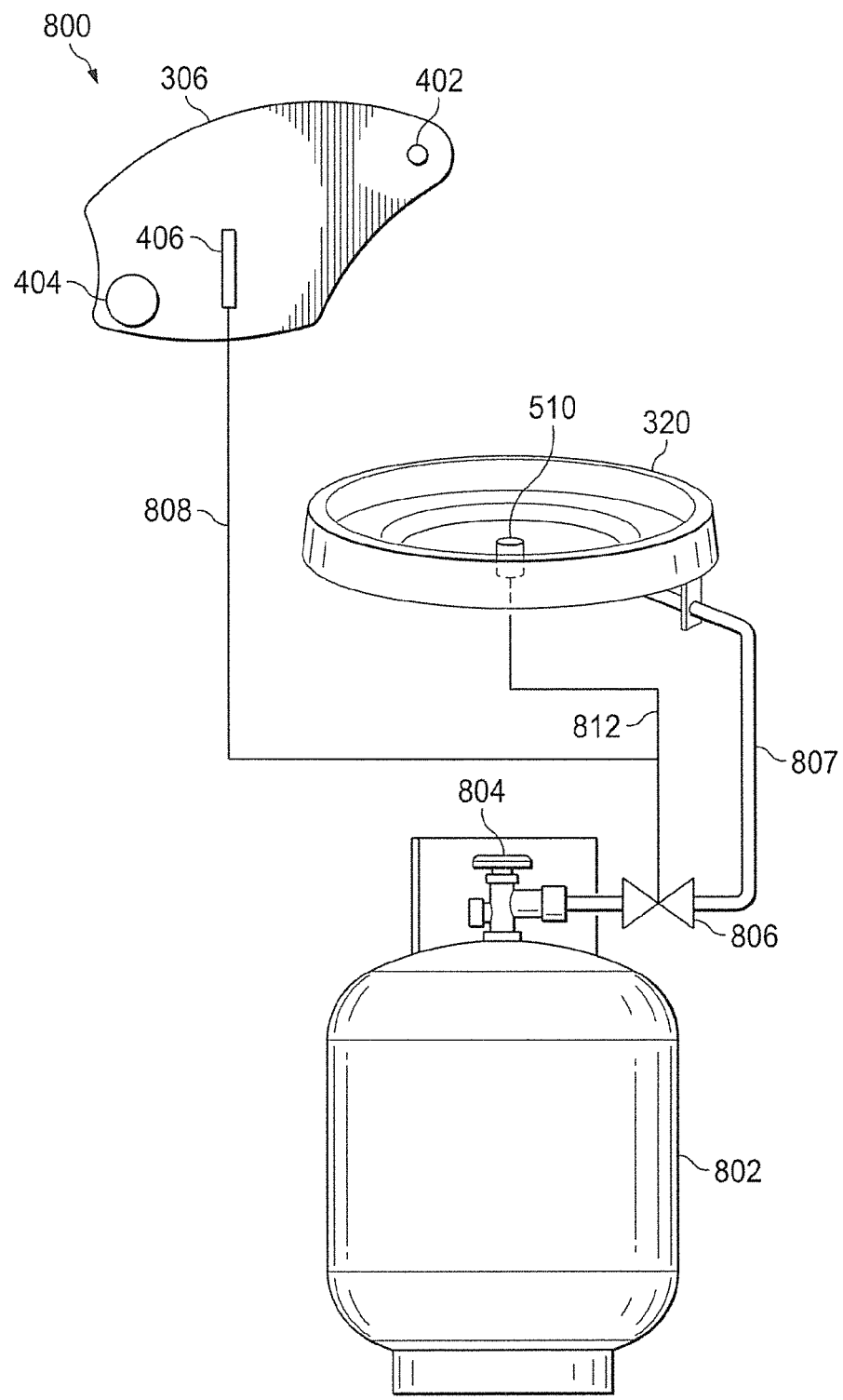
FIG. 8 is a schematic diagram of a thermocouple based safety system according to aspects of the present disclosure.

Referring now to FIG. 8 a schematic diagram of a thermocouple-based safety system 800 according to aspects of the present disclosure is shown. It is understood that the system 800 may be utilized within any of the embodiments described herein. As described above, various embodiments of the present disclosure may be adapted to utilize commercially available gas cylinders that may be stored in the pedestal of base 102. One such cylinder 802 of the 20-pound size is shown for illustration in FIG. 8. A standard gas fitting 804 may be used to supply gas into the system 800. A magnet valve 806 may be placed on a supply line 807 connecting the cylinder 802 to the burner 320. The magnet valve 806 may be electrically connected via connection 808 to the thermocouple 406 affixed to one of the iris leaves 306.

The thermocouple 510 may be affixed within, or in close proximity to, the burner 320, and electrically connected to the magnet valve 806 via electrical connection 812.

In operation, it may be desirable to ensure that gas is only supplied to the burner 320 when a flame is still being produced by the burner 320 (e.g., it has not blown out or otherwise been extinguished). Additionally, gas should only be supplied to the burner 320 when the device 100 is in an opened configuration to avoid burning of the iris members 306 and/or other components of the device 100. The thermocouple 406 produces an electric current in response to application of heat. Hence the electrical connection 808 will allow the thermocouple 406 to control the magnetic valve 806.

The magnetic valve 806 may be configured in a normally open configuration if there is no signal from the thermocouple 406, but may close in response to such a signal or voltage. The valve 806 may also close if no signal is received via electrical connection 812 from the thermocouple 510, which would indicate an absence of flame from the burner 320.

In other embodiments, the magnetic valve 306 could be a plurality of valves. In such an embodiment, a first valve may be in a normally open configuration and close in response to a current from the thermocouple 306. A second magnetic valve may be in a normally closed configuration that will only remain open in response to a voltage from the thermocouple 810 which indicates that the flame is still alight.

Figure 9A:
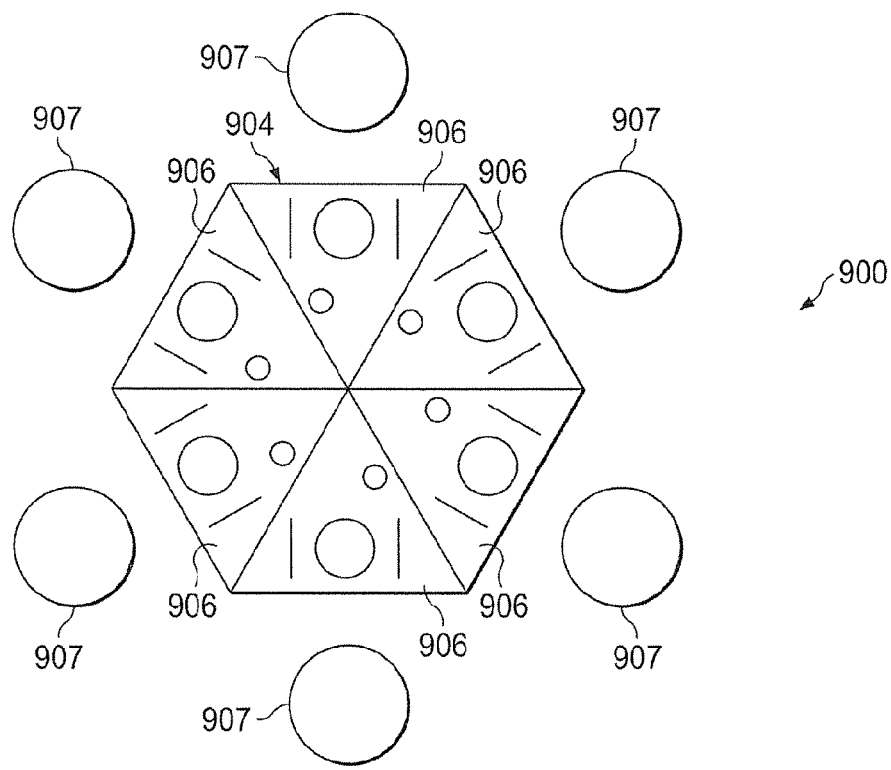
FIG. 9A is a top down view of another embodiment of an outdoor appliance with a retractable platform in a retracted position.
Figure 9B:
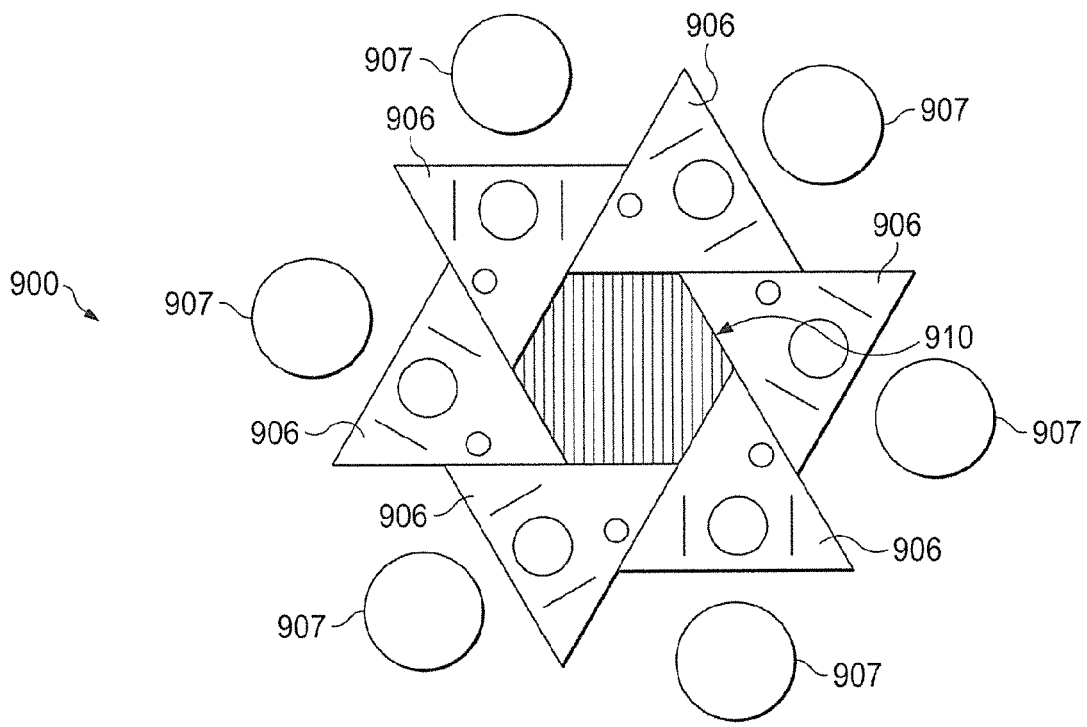
FIG. 9B is a top down view of the appliance of FIG. 8A with the platform exposed.
Figure 9C:
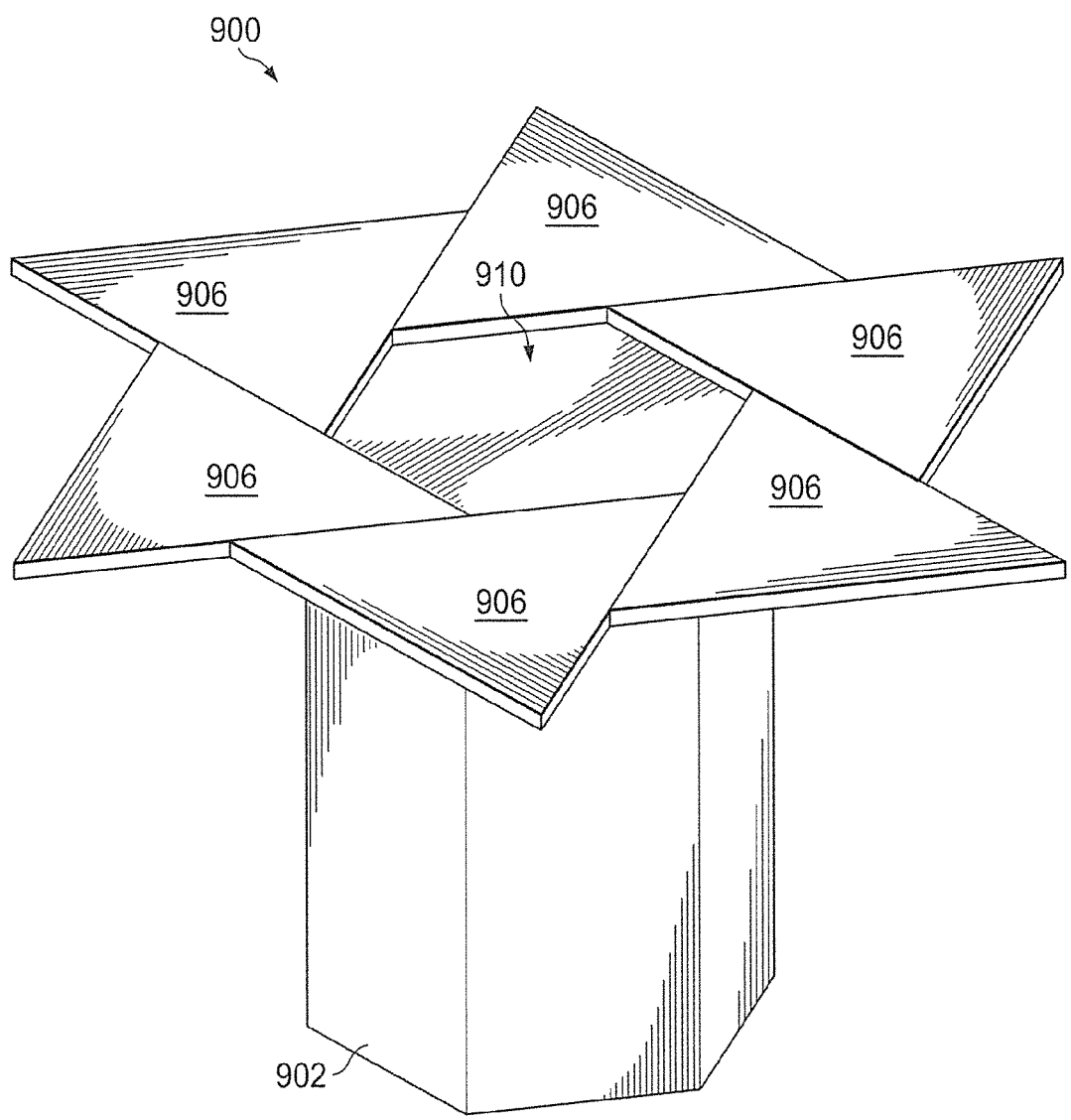
FIG. 9C is a perspective view of the appliance as shown in FIG. 8B.

Referring now to FIG. 9A, a top down view of another embodiment of an appliance 900 with a retractable platform a retracted position is shown. In this embodiment, a top 904 itself is the actuator (e.g., the whole table top rotates to actuate opening/closing and elevation/lowering). The top 904 comprises a number of discrete sections 906 that cooperate to selectively cover the enclosed fire bowl and burner. Chairs 907 are shown that correspond to each such section 906. FIG. 9B illustrates the change in the configuration when the sections 906 are rotated and translated relative to one another to reveal the platform 910, which may comprise a fire pit or other implement or device. As with previous embodiments, a system of tracks and followers may be used to implement the movement of the sections 906 and/or any elevation or lowering of the platform 910. As can be seen in FIG. 9B, each chair retains access to its associated portion of the top 904. Even though the configuration of the top 904 has changed to reveal and accommodate the fire bowl 910, the top 904 remains usable. FIG. 9C is a perspective view of the fire pit 900. A base 902 may contain the fuel source and all or a portion of the tracks and followers utilized to operate the top 904.

Figure 10A:
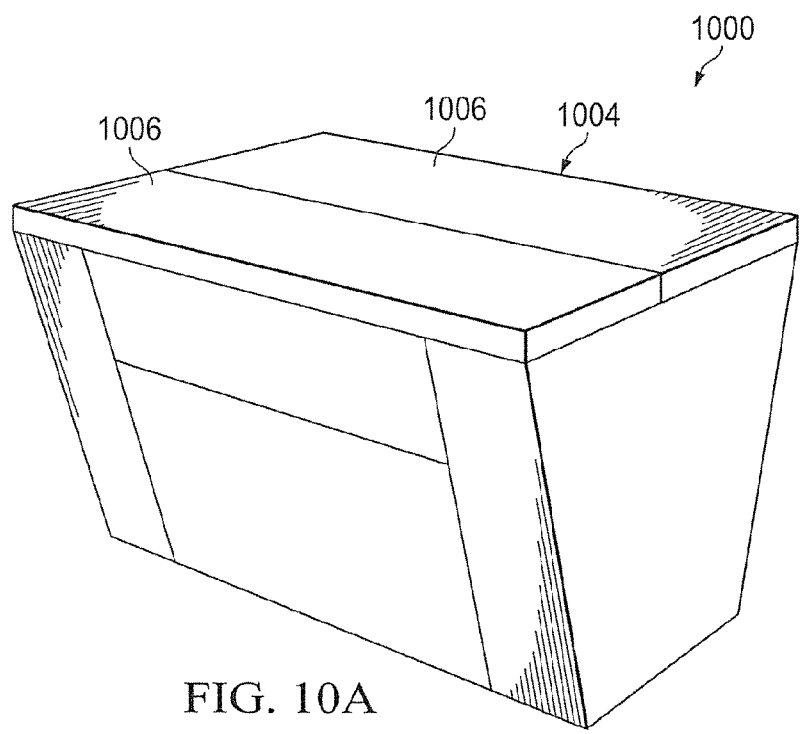
FIG. 10A is a perspective view of another embodiment of an outdoor appliance with a retractable platform in the retracted position.
Figure 10B:
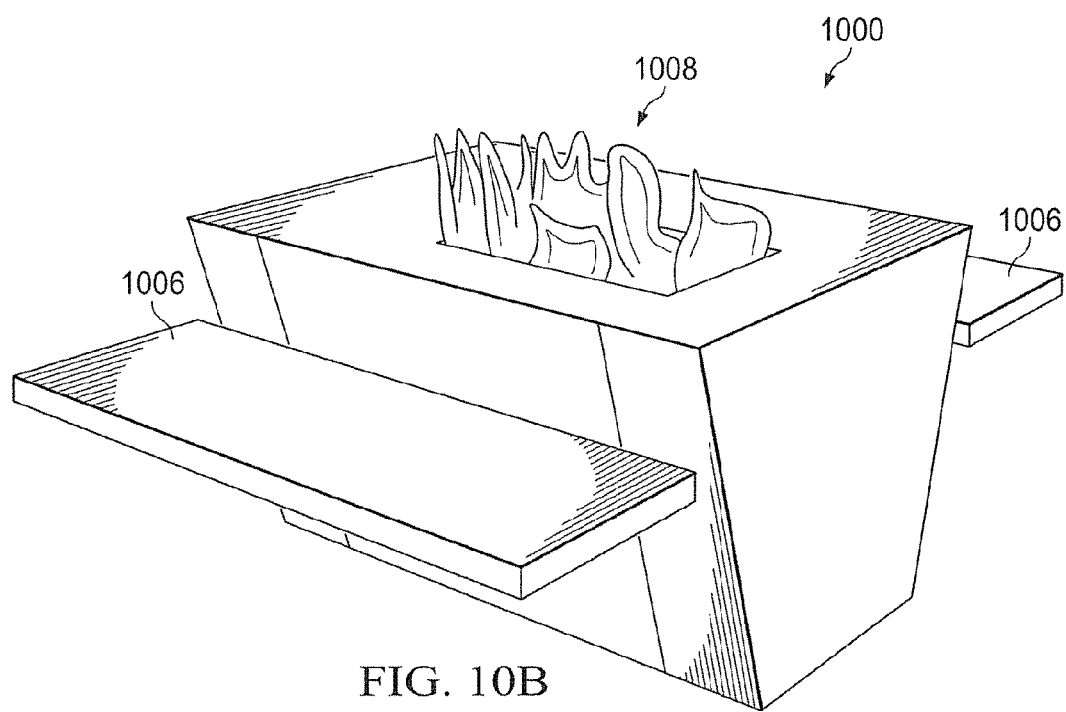
FIG. 10B is a perspective view of the appliance of FIG. 10A with the platform exposed.

It will be appreciated that the present disclosure is not intended to be limited to the specific shapes and operational movements that have been shown herein for purposes of illustration. For example, with reference now to FIG. 10A-10B, an embodiment of an appliance 1000 is shown having a linearly actuating top 1004. The top 1004 comprises two moveable panels 1006 that draw open to reveal and/or elevate the fire pit 1008. The panels move generally away from one another when the appliance 1000 is opened. In some embodiments, the panels 1006 slide apart to form an extension of the top 1004 when open. It other embodiments, where the appliance 1000 is sufficiently heavy, or otherwise securely anchored, the panels 1006 may become seating surfaces.

Figure 11A:
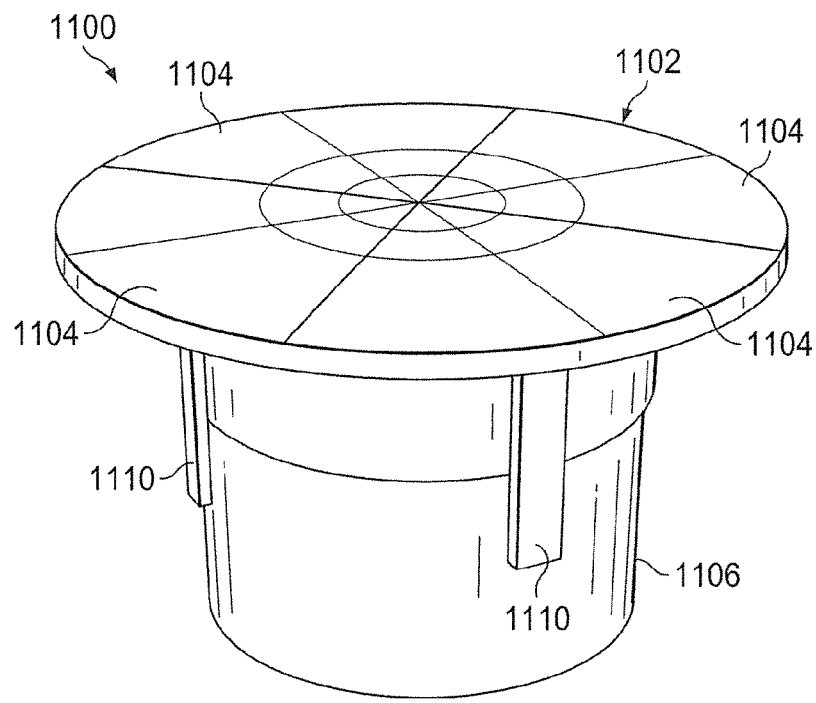
FIG. 11A is a perspective view of another embodiment of an outdoor appliance with a retractable platform shown in the retracted position.
Figure 11B:
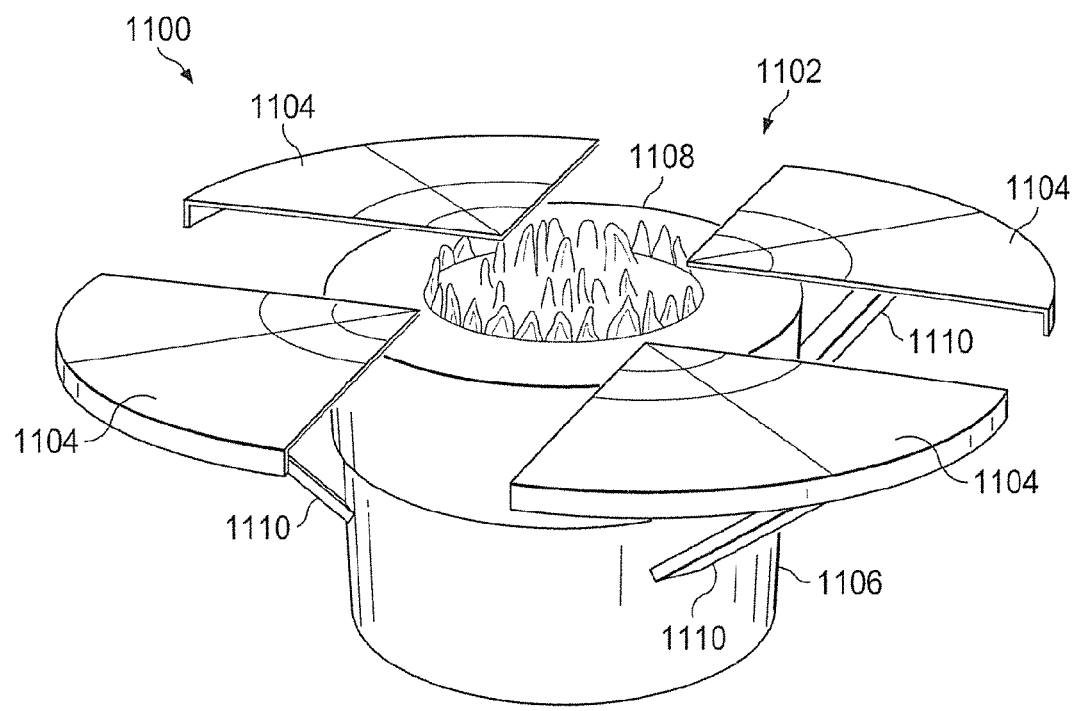
FIG. 11B is a perspective view of the appliance of FIG. 11A shown with the platform exposed.

Referring now to FIGS. 11A-11B, a fire pit 1100 is shown with a circular top 1102. The top 1102 comprises of a number of sections 1104 that translate away from a center of pedestal 1106. As with previous embodiments, the pedestal 1106 contains a platform 1108 which may comprise a fire bowl or other implement. Arms 1110 may connect to the sections 1104 and serve to actuate an internal elevation mechanism for the fire bowl 1108. The elevation mechanism may be a mechanical lever, a hydraulic mechanism, or other device.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A device comprising:
    a base having an open top;
    an actuator;
    a cover comprising a plurality of iris leaves on the open top providing an aperture coaxial with the open top that is moveable between a first closed position and a second open position in response to a first displacement of the actuator;
    a platform moveable from a first lower position within the base to a second raised position proximate the cover in response to a second displacement of the actuator;
    wherein the actuator further comprises:
       a rim proximate and below an outer edge of a table top surrounding the aperture acting as the actuator;
       an attached upper guide member that receives a plurality of followers each respectively attached to respective ones of the plurality of iris leaves; and
       an attached lower guide member attached to the rim that receives at least one follower attached to the platform;
    wherein the upper guide member moves the plurality of iris leaves by displacement of the plurality of followers each respectively attached to the respective ones of the plurality of iris leaves in response to the first displacement of the actuator;
    wherein the lower guide member moves the platform by displacement of the at least one follower attached to the platform in response to the second displacement of the actuator; and
    wherein the upper guide member has at least one track respectively receiving at least one of the plurality of followers each respectively attached to the respective ones of the plurality of iris leaves, the track defining a first, translating section adjacent to a second, non-translating section, the translating section providing for displacement of the at least one of the plurality of followers each respectively attached to the respective ones of the plurality of iris leaves and the non-translating section allowing rotation of the upper guide member without displacement of the at least one of the plurality of followers each respectively attached to the respective ones of the plurality of iris leaves.

2. The device of claim 1, wherein the lower guide member has at least one track receiving the at least one follower attached to the platform, the at least one track of lower guide member defining a first inclined section adjacent to a second, level section, the inclined section providing for elevation and lowering of the at least one follower attached to the platform and the level section allowing rotation of the lower guide member with no elevation change to the at least one follower attached to the platform.

3. The device of claim 2, wherein the upper guide member is affixed to the lower guide member such that the translating section of the upper guide member is positioned atop the level section of the lower guide member and the non-translating section of the upper guide member is positioned atop the inclined section of the lower guide member.

4. The device of claim 2, wherein the base further comprises a platform guide member that receives the at least one follower attached to the platform and substantially restricts rotation of the platform.

5. The device of claim 1, wherein the platform further comprises a gas burner.

6. The device of claim 5, further comprising a drawer contained within the base for retaining an operational fuel container for the gas burner.

7. The device of claim 5, further comprising a heat shield in the base for shielding the fuel container from the gas burner.

8. A device comprising:
    a base having an open top;
    a tabletop positioned proximate the open top of the base and having an aperture coaxial with the open top of the base;
    a cover for the aperture moveable between a first closed position and a second open position in response to a displacement of a first follower affixed to the cover;
    a platform moveable from a first lower position within the base to a second raised position proximate the tabletop in response to a displacement of a second follower affixed to the platform; and
    an upper guide member defining at least one track that receives the first follower and displaces it to effect opening of the aperture in response to rotation of the upper guide member relative to the base;
    wherein the at least one track of the upper guide member has a first section that displaces the first follower from an inner position, corresponding to the closed position of the cover, to an outer position, corresponding to the open position of the cover, and the upper guide member has a second section that allows the upper guide member to rotate but retains the first follower in the outer position.

9. The device of claim 8, further comprising a lower guide member defining at least one track that receives the second follower and elevates it to effect raising of the platform from the first lower position to the second raised position.

10. The device of claim 9, wherein the at least one track of the lower guide member has a level portion that allows rotation of the lower guide member without elevation of the platform and has a second inclined portion that elevates the platform in response to rotation of the lower guide member.

11. The device of claim 8, wherein the cover comprises a multi-bladed iris with the first follower attached to a blade of the multi-bladed iris.

12. The device of claim 8, wherein the platform further comprises a gas burner.

13. A fire pit comprising:
    a pedestal base having an open top and a laterally opening sliding drawer for receiving a compressed gas cylinder;
    a table top proximate the open top of the pedestal base and having an aperture coaxial with the open top of the pedestal base;
    a rotatable actuator proximate the table top;
    a multi-bladed iris diaphragm having a plurality of blades and that is displaceable between a first closed position in which the aperture is closed and a second open position in which the aperture is open;

a thermocouple affixed to the diaphragm providing a signal to a magnetic valve on a gas supply line and configured to interrupt a flow of gas from the compressed gas cylinder in response to application of heat to the thermocouple;

a fire platform configured to be positioned above a location corresponding to the compressed gas cylinder that is displaceable from a first lower position within the pedestal base to a second upper position proximate the table top;

wherein the actuator provides a first set of tracks that correspond respectively to a first set of track followers respectively attached to the plurality of blades of the multi-bladed iris diaphragm such that the tracks displace the plurality of blades of the multi-bladed iris diaphragm outward from the aperture in response to rotation of the actuator in a first direction a first, predetermined rotational distance; and wherein the actuator provides a second set of tracks that correspond respectively to a second set of track followers attached to the fire platform such that the fire platform is elevated from the first lower position to the second upper position in response to rotation of the actuator in the first direction a second, predetermined rotational distance.

14. The fire pit of claim 13, further comprising another thermocouple proximate the fire platform providing a signal to the magnetic valve on the gas supply line and configured to interrupt the flow of gas in response to loss of heat from the fire platform.

* * * * *